(12) United States Patent
Wong

(10) Patent No.: US 9,216,679 B1
(45) Date of Patent: Dec. 22, 2015

(54) ADJUSTABLE FOOTREST

(75) Inventor: Barnitus A. Wong, Dearborn, MI (US)

(73) Assignee: Barnitus A. Wong, Clackamas, OR (US)

( * ) Notice: Subject to any disclaimer, the term of this patent is extended or adjusted under 35 U.S.C. 154(b) by 0 days.

(21) Appl. No.: 13/481,853

(22) Filed: May 27, 2012

(51) Int. Cl.
*B60N 3/00* (2006.01)
*B60N 3/06* (2006.01)

(52) U.S. Cl.
CPC . *B60N 3/063* (2013.01); *B60N 3/06* (2013.01)

(58) Field of Classification Search
CPC .......... A45F 3/22; A47B 13/16; A47B 23/02; A47B 23/025; A47B 37/00; F16M 11/10; B63B 29/06; B60N 3/06; B60N 3/063
USPC ............ 248/165, 166, 346.01, 349.1; 74/512; 108/8, 15; 297/423.46, 423.44, 423.41
See application file for complete search history.

(56) References Cited

U.S. PATENT DOCUMENTS

| | | | | |
|---|---|---|---|---|
| 836,551 | A * | 11/1906 | Werner | 108/9 |
| 1,283,326 | A * | 10/1918 | Schreck | 211/182 |
| 1,373,027 | A * | 3/1921 | Simon | 108/8 |
| 1,957,165 | A * | 5/1934 | Gingras | 108/49 |
| 2,299,910 | A * | 10/1942 | Linderme | 108/141 |
| 2,686,094 | A * | 8/1954 | Terry | 108/8 |
| 2,874,003 | A * | 2/1959 | Humphries | 182/153 |
| 3,065,992 | A * | 11/1962 | Nagel | 297/423.46 |
| 3,066,322 | A * | 12/1962 | Derby | 5/651 |
| 3,163,468 | A * | 12/1964 | Koch | 297/423.46 |
| 3,403,611 | A * | 10/1968 | Stinson | 396/183 |
| 3,753,557 | A * | 8/1973 | Kelley | 5/648 |
| 3,940,181 | A * | 2/1976 | Cheek, Jr. | 297/423.46 |
| 4,277,660 | A * | 7/1981 | Lemmer | 200/86.5 |
| 4,684,087 | A * | 8/1987 | Spickard | 248/97 |
| 4,691,885 | A * | 9/1987 | Lawrance | 248/165 |
| 4,729,394 | A * | 3/1988 | Timmes et al. | 134/199 |
| 4,754,711 | A * | 7/1988 | Solomon | 108/8 |
| 4,853,990 | A * | 8/1989 | Elder et al. | 5/634 |
| 4,934,638 | A * | 6/1990 | Davis | 248/164 |
| 5,016,844 | A * | 5/1991 | Garvin | 248/97 |
| 5,046,206 | A * | 9/1991 | Broyles | 5/646 |
| 5,054,144 | A * | 10/1991 | Stuart et al. | 5/648 |
| 5,352,015 | A * | 10/1994 | Morgan | 297/463.1 |
| 5,367,976 | A * | 11/1994 | Van Schaik | 114/347 |
| 5,419,618 | A | 5/1995 | Hatcher | |
| 5,503,312 | A * | 4/1996 | Kassner | 223/120 |
| 5,520,293 | A * | 5/1996 | Hartley | 211/182 |
| 5,584,535 | A | 12/1996 | Jacobson et al. | |
| 5,622,403 | A * | 4/1997 | Gonda | 297/19 |
| 5,964,178 | A * | 10/1999 | Gonda | 114/354 |
| 6,027,000 | A * | 2/2000 | Sterzel et al. | 224/42.33 |

(Continued)

*Primary Examiner* — Nkeisha Smith

(57) ABSTRACT

This embodiment relates generally to the Footrest system (200) to brace a rower under rowing stress when rowing a watercraft (32), which allows an operator (316) to row watercraft (32) in a safe, ergonomic, efficient, comfortable, and convenient manner. The footrest (200), enables the counteraction of oaring forces imparted by rower, while allowing footrest system (200) to meaningfully adjustable in several independent axis and angle relative to operator (316) location in watercraft (32). An inner guide system (204) can trap foot board (210) in a secured fore and aft position, or allow it to slidably travel within watercraft (32). An outer guide system (202) can trap foot board (210) in a desired angle. The footrest system (200) also allows the movement and trapping of foot board (210) in a flat position and in a negative angle and backward position so it can be a meaningful and comfortable leg rest.

20 Claims, 16 Drawing Sheets

(56) References Cited

U.S. PATENT DOCUMENTS

| | | | |
|---|---|---|---|
| 6,511,026 B2 * | 1/2003 | Hatfield | 248/97 |
| 6,551,091 B1 * | 4/2003 | Bryant et al. | 425/389 |
| 6,846,043 B1 * | 1/2005 | Leoutsakos | 297/423.46 |
| 7,066,432 B2 * | 6/2006 | Wood et al. | 248/99 |
| 7,083,055 B1 * | 8/2006 | Ambrosat | 211/85.7 |
| 7,278,515 B2 * | 10/2007 | Moser et al. | 182/152 |
| 7,607,625 B2 * | 10/2009 | Wang | 248/309.1 |
| 7,708,348 B2 * | 5/2010 | Barr | 297/423.46 |
| 7,874,885 B2 * | 1/2011 | Matsueda et al. | 440/104 |
| 8,506,010 B2 * | 8/2013 | Kane | 297/158.3 |
| 8,550,025 B2 * | 10/2013 | Machida | 114/363 |
| 2005/0187074 A1 | 8/2005 | Barr | |
| 2010/0018450 A1 * | 1/2010 | Matsueda et al. | 114/363 |

* cited by examiner

ADJUSTABLE FOOTREST

CROSS REFERENCE TO RELATED APPLICATIONS

This application is the continuation of and claims the benefit of U.S. patent application Ser. No. 13/149,385, entitled "ROWING RIG" filed on May 31, 2011, by the present inventor, which is incorporated herein by reference in its entirety.

BACKGROUND

Prior Art for Adjustable Footrest

The following is a tabulation of some prior art that presently appears relevant:

| U.S. Patents | | | |
| --- | --- | --- | --- |
| Pat. No. | Kind Code | Issue Date | Patentee |
| 4,277,660 | | Jul. 7, 1981 | Lemmer |
| 5,584,535 | | Dec. 17, 1996 | Jacobson et al. |
| 5,419,618 | | May 30, 1995 | Hatcher |
| US2005/0187074A1 | | Aug. 25, 2005 | Barr |

| Non Patent Literature Documents |
| --- |
| None |

Fishing from a paddled watercraft, such as a canoe or kayak, have become popular activities. Such fishing presents many benefits, especially in small, shallow water locations, where stealth and a shallow draft are almost prerequisites to successfully fish these conditions. The paddled watercraft, having a relatively narrow width, typically not much wider than to necessitate two people exchanging places in a canoe version, is a very maneuverable craft propelled and steered by a paddler in the aft position, and sometimes also including a paddler in the fore position. But paddling does not have the same ability to generate speed or to turn the paddled watercraft than if this watercraft was rowed instead. The rowing method is superior because an oar is often twice as long as a paddle, resulting in longer leverage. However, in order for the rower to row at the highest efficiency, the rower has to brace their feet against a fixed footrest so that they can counteract any rowing forces, and that they can transmit those forces onto the canoe. This then would remove any sliding sitting forces, forces that can contribute to sitting fatigue.

Fixed footrest, which fit inside a watercraft, is old and well known in the art. These devices are presently available to bear the brunt in resisting the movement of the rower under rowing stress. In more recent times, these devices have been provided with attachments and allow such devices to be attached to a paddled watercraft. Footrest are generally configured in a fixed angled position, extending from the bottom of the craft, in a fixed up and down position, and in a fixed fore-aft position as well for the rower. Effectively, the footrest position and angle in space relative to the rower is fixed. However, this fixed settings are often not suitable in providing the most ergonomic and efficient way of bracing all rowers during rowing. Several prior art have addressed these limitations by providing means to adjust the footrest location, typically often only in the up and down location, and the angle in small angle changes limited to the footrest facing the rower. These adjustments are limited to a modest range simply to fine tune efficiency. Most often, these prior art improvements simply address the ease of performing such adjustment, but often incurring a loss of an adjustment in order to gain another, a dependant change. Additionally, most footrest simply perform as a footrest. They are not designed to take the greater stress of a rower rowing and bracing themselves against them.

Additionally, because of the limited space in canoes, and because a canoe trip often engender picnicking with food and beverages along the occasional consequential nap, there is the untapped need to provide a cooking table/picnic table and a leg rest that is a known art embodied in a reclining armchair, without taking up more space in the already space-challenged canoe. Thus it is prudent that the footrest is designed with the multi-function ability to also multi-function perform to meet these additional activities.

I have found that the current footrest designs are one dimensional as they simply serve the act of being a footrest, barring any multifunction use mentioned above.

I have also found that they too have adjustment that are not independent of each other, limiting in achieving the highest rowing efficiency and comfort. Because no two people have the same build, rowers often require differing footrest locations and angles in order to achieve maximum rowing efficiency and comfort. Although the current art often allows the rower to adjust how high his feet during rowing stroke, this adjustment alone is not sufficient enough to fully optimize his efficiency and comfort.

Furthermore, because of the dependant relationship between two or more adjustments, the current art does not allow him to adjust how far away his feet are from his hip joint without causing changes in footrest angles that rob ergonomics. This diminished level of efficiency and comfort is even more so for fixed seat rowing when the rower has less ability to compensate for this poor ergonomic setup. Additionally, this dependant adjustment does not allow him to achieve a knee height position that does not interfere with the low point of his rowing stroke, all this while keeping his ergonomic foot rest fore and aft location and angle intact for the greatest efficiency and comfort. This is especially true when the oar is long, causing the handle low rowing point to sweep closer to the hull of the boat, thus needing to have a lower lap to avoid interference.

Thus it is advantageous to have a footrest system to be adjusted in THREE (3) dimensions: up and down (Z axis), fore and aft (X axis), and tilt (Angle change). It is additionally advantageous for the tilt to be positive (facing rower) as a load-bearing footrest, horizontal for use as a load-bearing table or platform, and negative (facing away from rower) to act as a load-bearing leg rest.

Additionally, it is also advantageous to have this multi-variable adjustment performed quickly without having to moor the boat, i.e. an operation done on the fly (minimal downtime and while in the boat). This is particularly useful for switching between rowers of differing statures. Therefore, the ability to optimize the footrest setup for a differing stature will allow a quick trade between a first rower and a second rower without causing significant down time in travel.

Additionally, it would be advantageous for this multi-variable adjustment to be performed without the need for special or even any tools. This reduces the need to carry tools that simply add unnecessary weight to the craft load. Since there is no need for tools, this reduces the chance of losing tools that further complicates this adjustment.

In addition to speed, this adjustment should be simple, highly reproducible and repeatable in recalling prior footrest locations. The obviousness of such adjustment would make it accessible even to the most unseasoned rower.

Due to the tight quarters and cramped nature of canoes, and due to the high footrest force during rowing, I have found that safety requires the rower to have full control of watercraft in a seated position, barring any need to move about. This means he can operate the canoe from his seat, giving him a cockpit like effect. Thus I have found that if I can attach a footrest closer to the rower in a way that makes it adjustable but unmovable under stress, the rowing operation is safer and uninterrupted in nature. This way, he is able to perform any watercraft related task with sufficient clearances, and yet find all the contraptions within easy, fast, and ergonomic reach.

In FIG. 1, the adjustable footrest in U.S. Pat. No. 4,277,660, issued to Lemmer, only provides independent vertical, horizontal and angular adjustments. However, the art does not provide a negative angle adjustment nor one high enough or rearward to act as a leg rest, especially when it is attached to a body such as a boat as a prerequisite to counteract rowing forces. Additionally, it does not provide footrest lateral movement along this negative angle plane. Additionally this art does not provide a fore and aft adjustment independent of height and angle. Rather, this art fore and aft adjustment affects height simultaneously. This art is also designed for resting foot during sitting, and not sturdy in its locking devices to withstand the bracing forces of a rower. Additionally, the art requires many detailed and expensive parts to achieve this independent adjustments.

In FIG. 2, the adjustable footrest in U.S. Pat. No. 5,584,535, issued to Jacobson et al, dated Dec. 17, 1996, only shows an adjustment in vertical direction (Z-axis) and is thus lacking adjustment in the fore and aft direction. Also, this art suffers from only having a vertical adjustment only possible by the fixed slots, barring any adjustments between them. Additionally, although this art provides a negative angle, it lacks any sliding movement along this plane, barring it from acting as a proper leg rest since the portion of the leg (calf) that needs to be supported requires a rearward location of the negative angled surface.

In FIG. 3, the ergonomic footrest in U.S. Pat. No. 5,419,618, issued to Hatcher, dated May 30, 1995, suffers the same fates as the above art in FIG. 2 whereby it only shows an adjustment in vertical direction (Z-axis) and is thus lacking adjustment in the fore and aft direction, an essential adjustment if it is secured to a hull and when there is a fixed seat position for a rower. Also, this art suffers from only having an vertical adjustment only possible by the fixed slots, barring any adjustments between them. Additionally, although this art provides a negative angle, it lacks any sliding movement along this plane, also barring it from acting as a proper leg rest.

In FIG. 4, the adjustable footrest in patent US2005/0187074A1, issued to Barr, dated Aug. 25, 2005, suffer the limitation of having to change vertical adjustment in order to achieve the desired angle. This dependant nature art also lacks adjustment in the fore and aft direction, an essential adjustment if it is secured to a hull and when there is a fixed seat position for a rower. Additionally, although this art lacks a negative angle, and further lacks any sliding movement along this plane, both lackings barring it from being a proper leg rest.

Advantages

Accordingly several advantages of one or more aspects are as follows: the ability to adjust a footrest in the fore-aft, vertical, and multi angle positions in an independent manner for varying rower builds, the ability to provide meaningful adjustment range within each adjustment, the ability to resist the high bracing foot forces rower imparts onto it under rowing pressure, the ability to provide a footrest setting to row the boat ergonomically, the ability to perform such adjustments without any tools or high need for skill and training, the ability to perform such adjustment without incurring any time-consuming downtime such as mooring, the ability to recall prior locations in a highly reproducible and repeatable way, the ability to fit the art into a canoe of limited real estate from having fixed seats and to function with these fixed seat, the ability to not deform a plastic canoe under rowing operation, the ability to multi function such as a picnic table and leg rest, and the ability to be accessible and within ergonomic reach from a seated rowing position without impeding other functions such as rowing. Other advantages of one or more aspects will be apparent from a consideration of the drawings and ensuing description.

DRAWINGS

Figures

Notice:

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Figure 9:
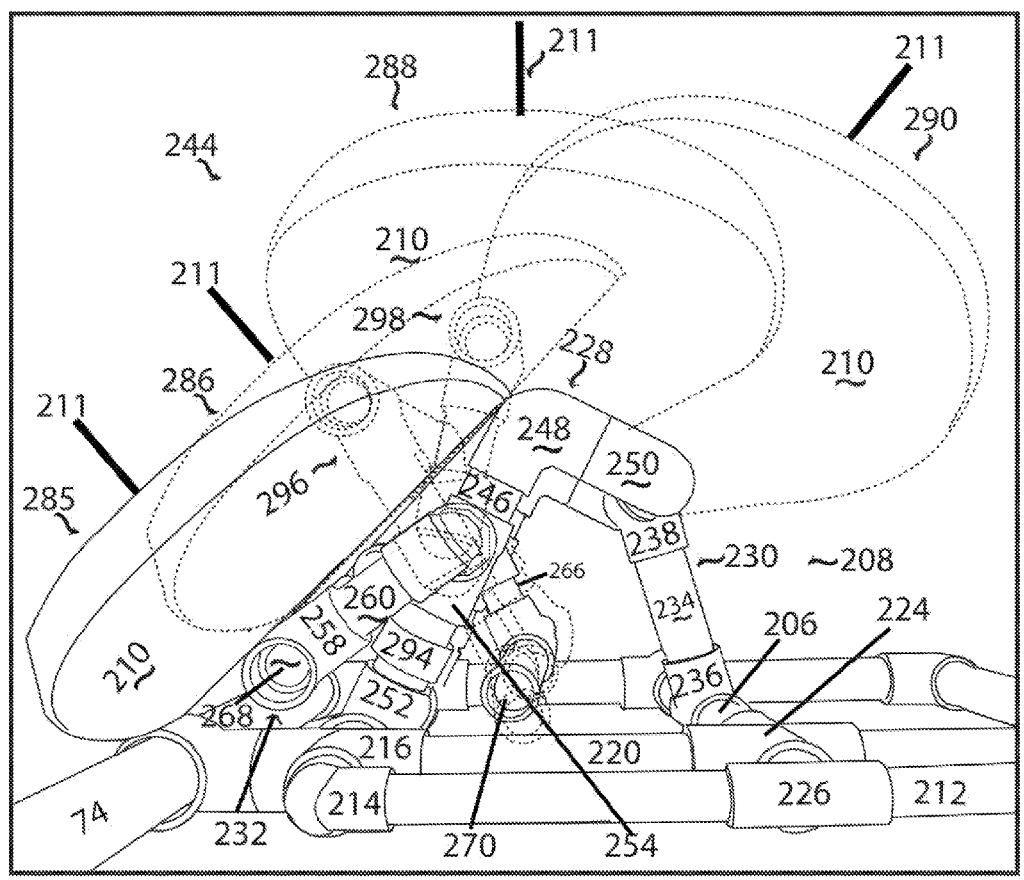
Figure 10:
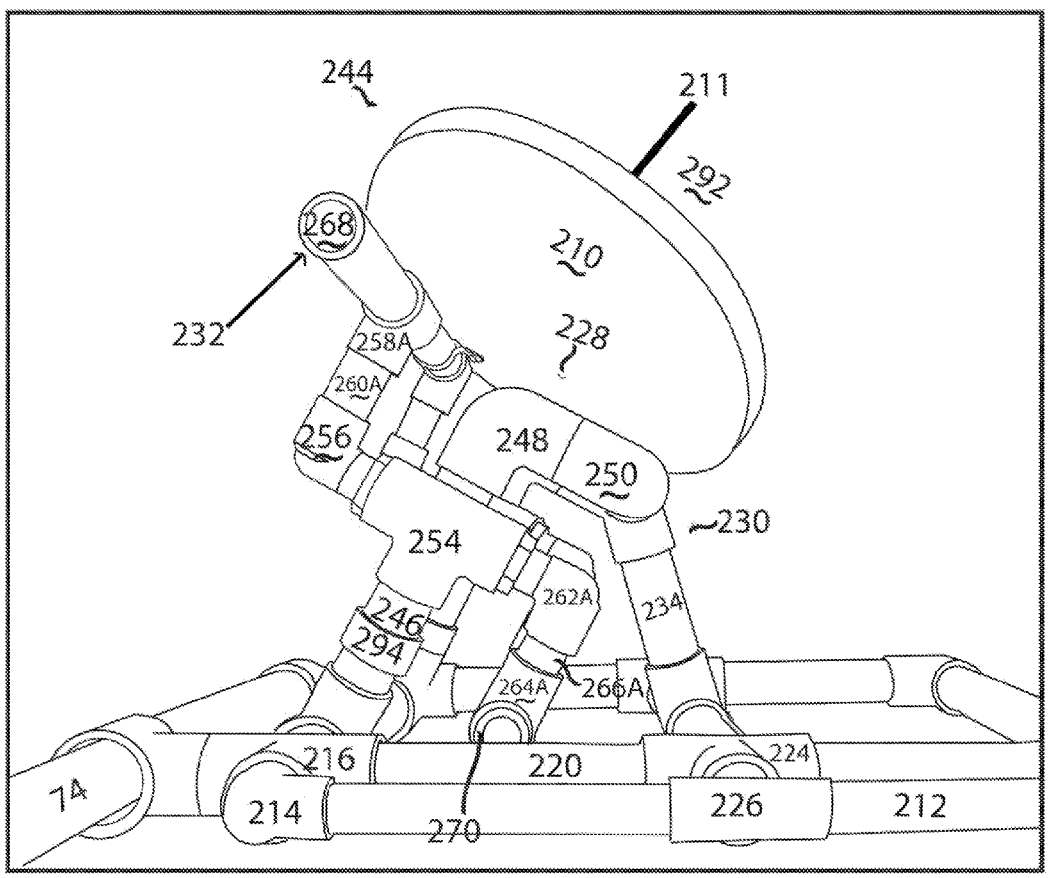

FIG. 9. is a side view of Foot rest system with sequences of various foot board position FIG. 10. is a side view of Foot rest system Reverse-Angle-but-Rearward position.

Figure 11:
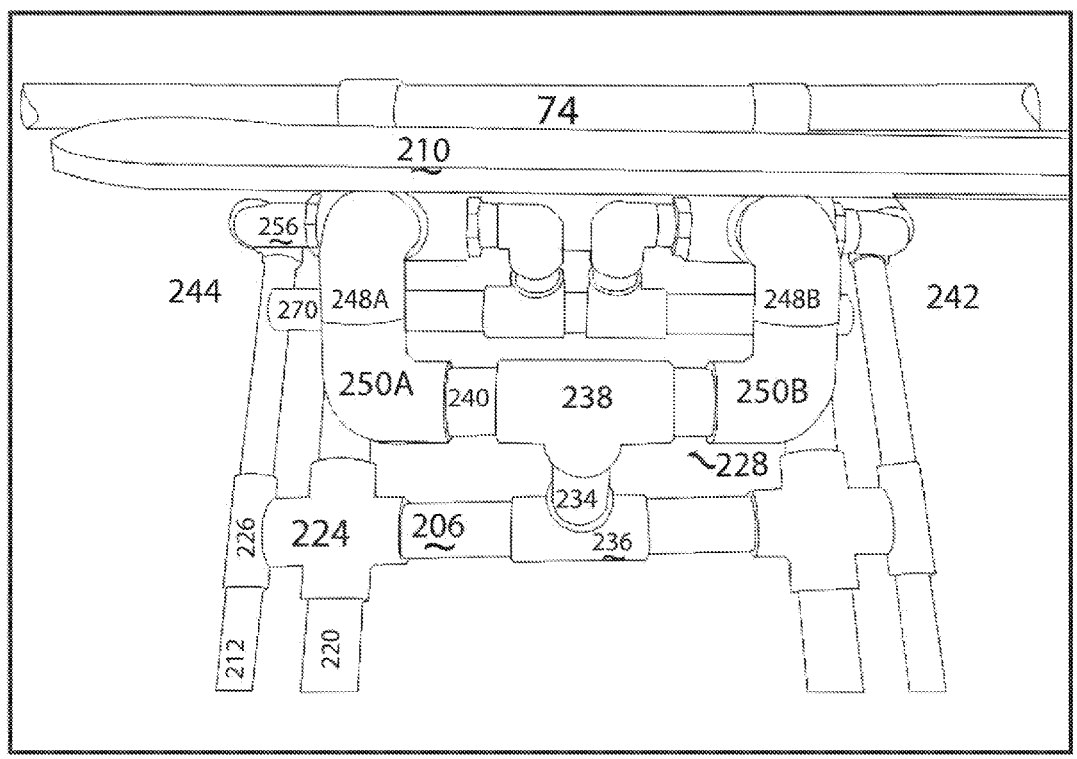

FIG. 11. is a top front view close-up of Foot rest system

Figure 12:
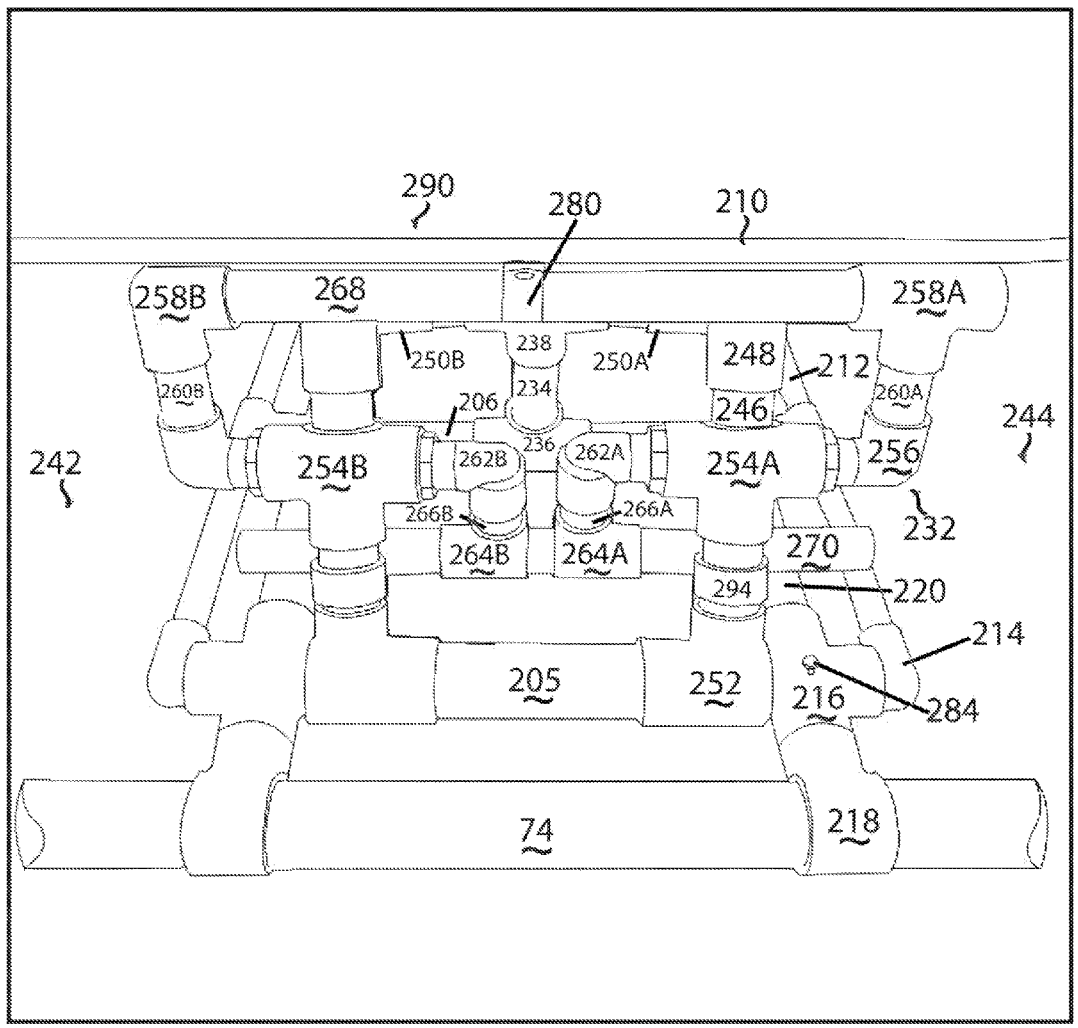

FIG. 12. is a rear view of Foot rest system in position 290 for clarity.

Figure 13:
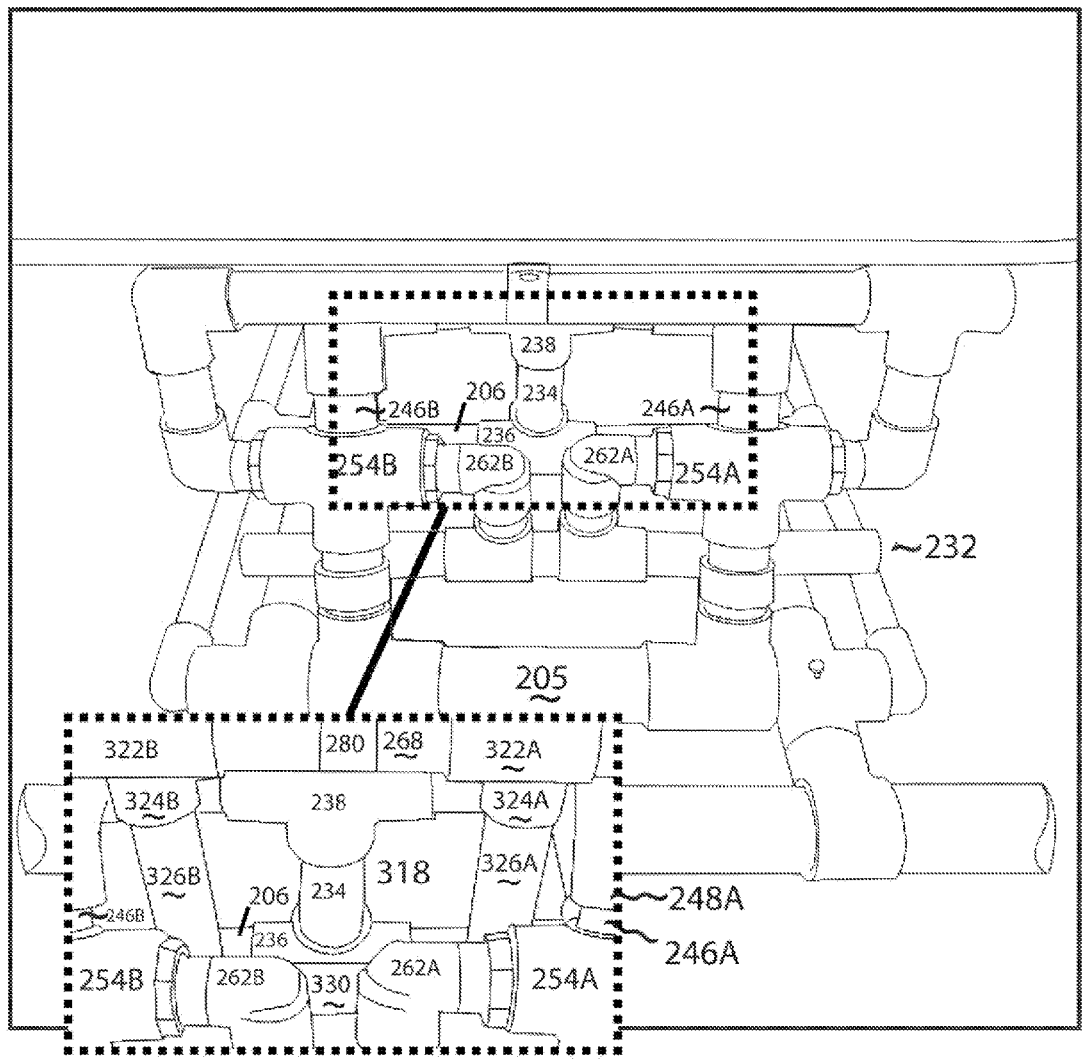

FIG. 13 is a rear view of Foot rest system in position 290 with the self centering feature in place.

Figure 14:
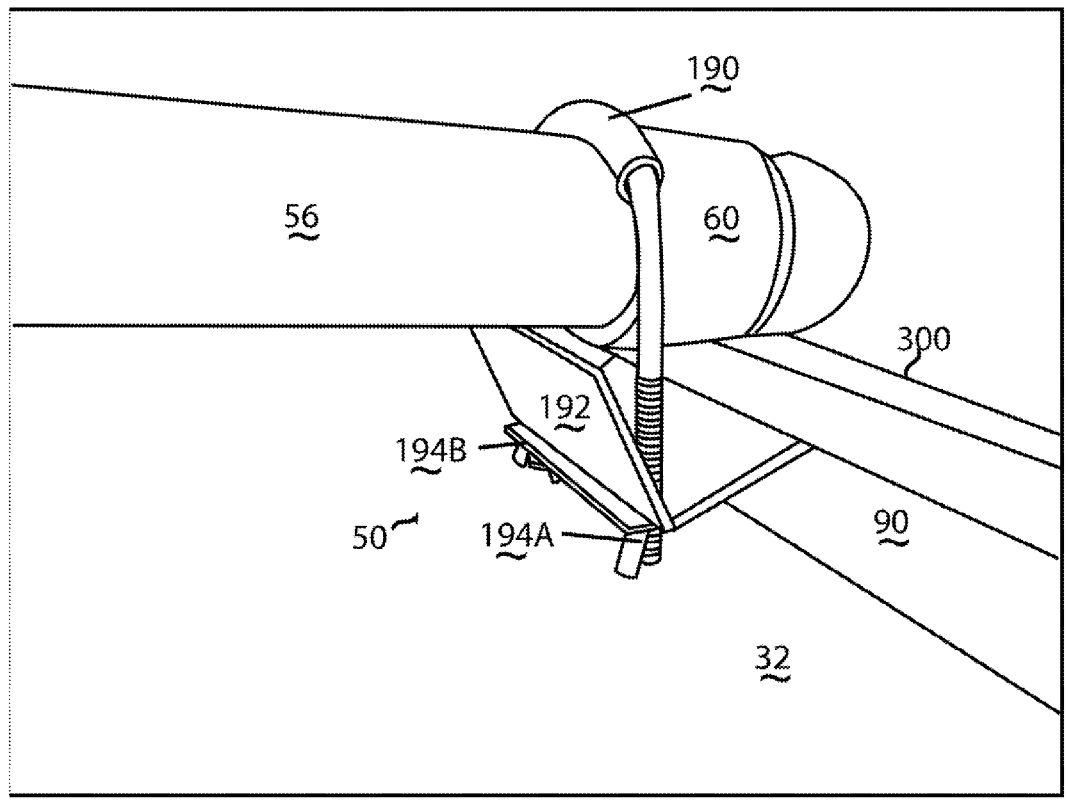

FIG. 14 is a view of attaching Rowing rig onto the gunwale

ALTERNATE EMBODIMENTS

Figure 15:
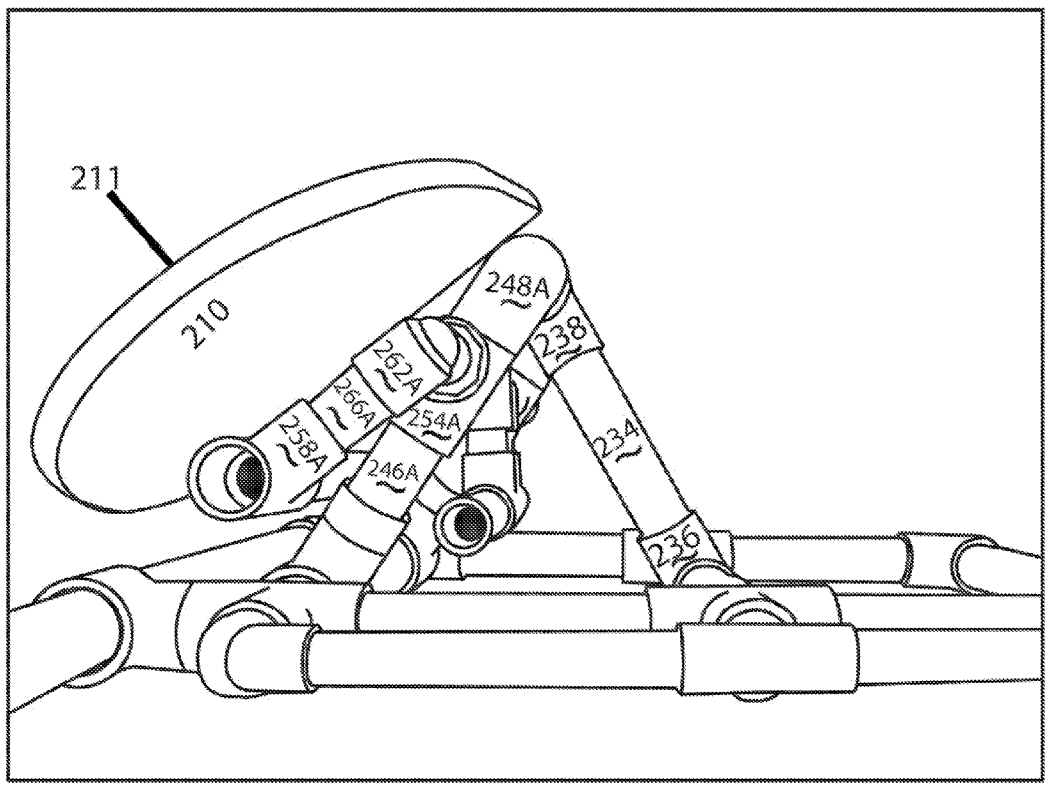

FIG. 15 is a view of Foot Rest Alternative embodiment to Bridge member 240 connection to BS first 90 degree fitting 248

Figure 16:
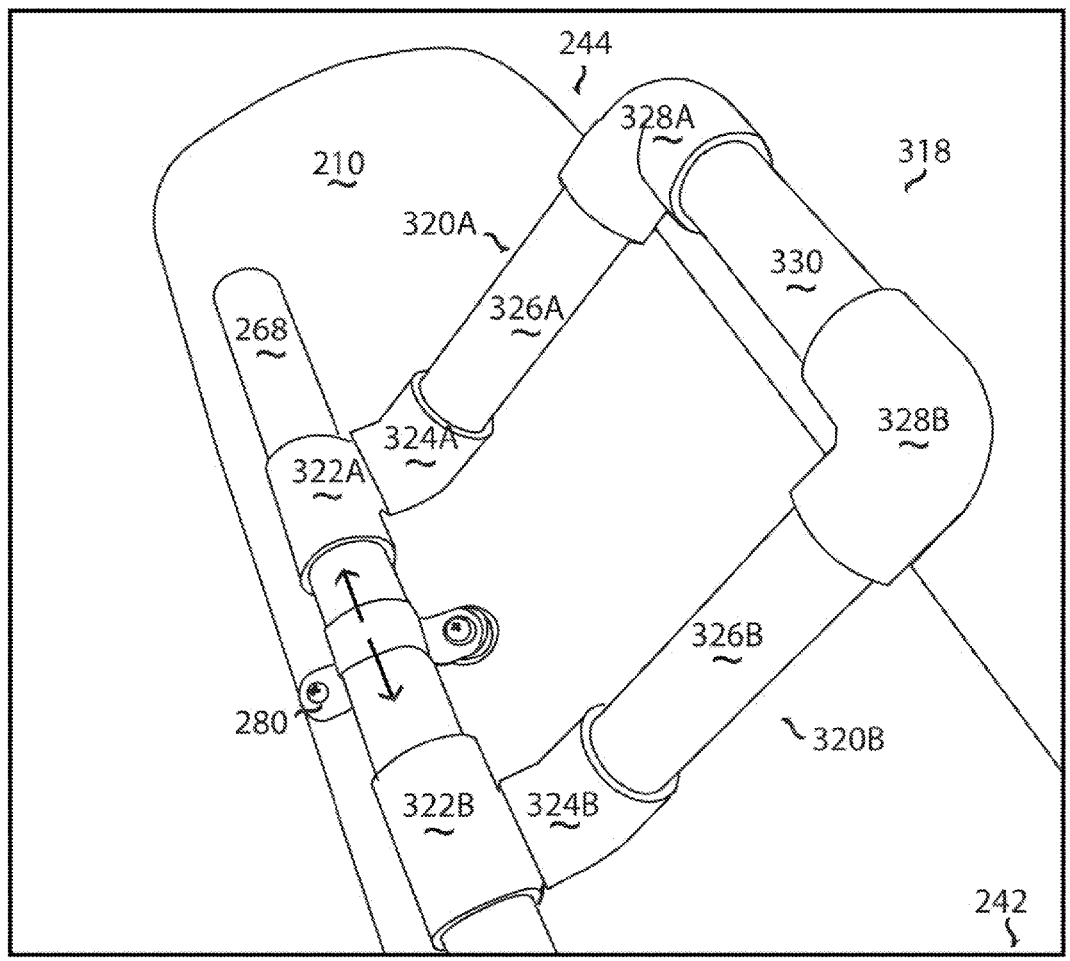

FIG. 16 shows self centering feature connected to foot board and first sliding member.

Figure 17:
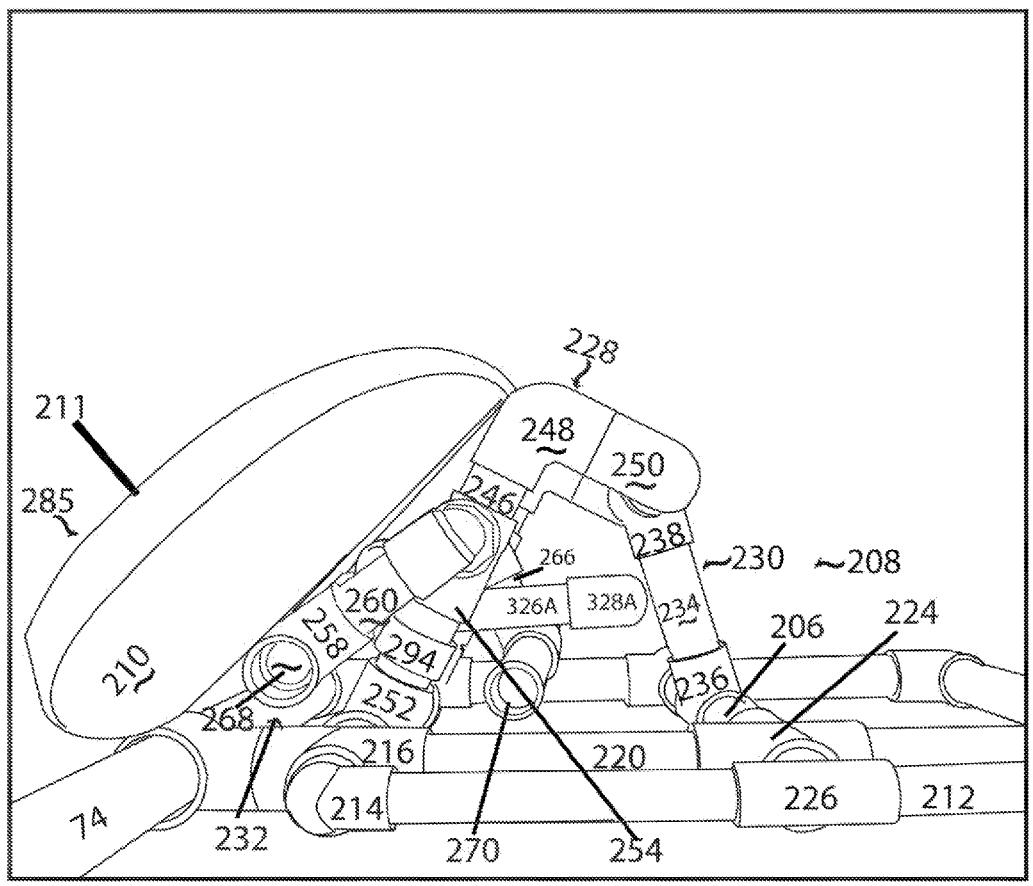

FIG. 17 shows a side view of self centering feature in relation to footrest

Figure 18:
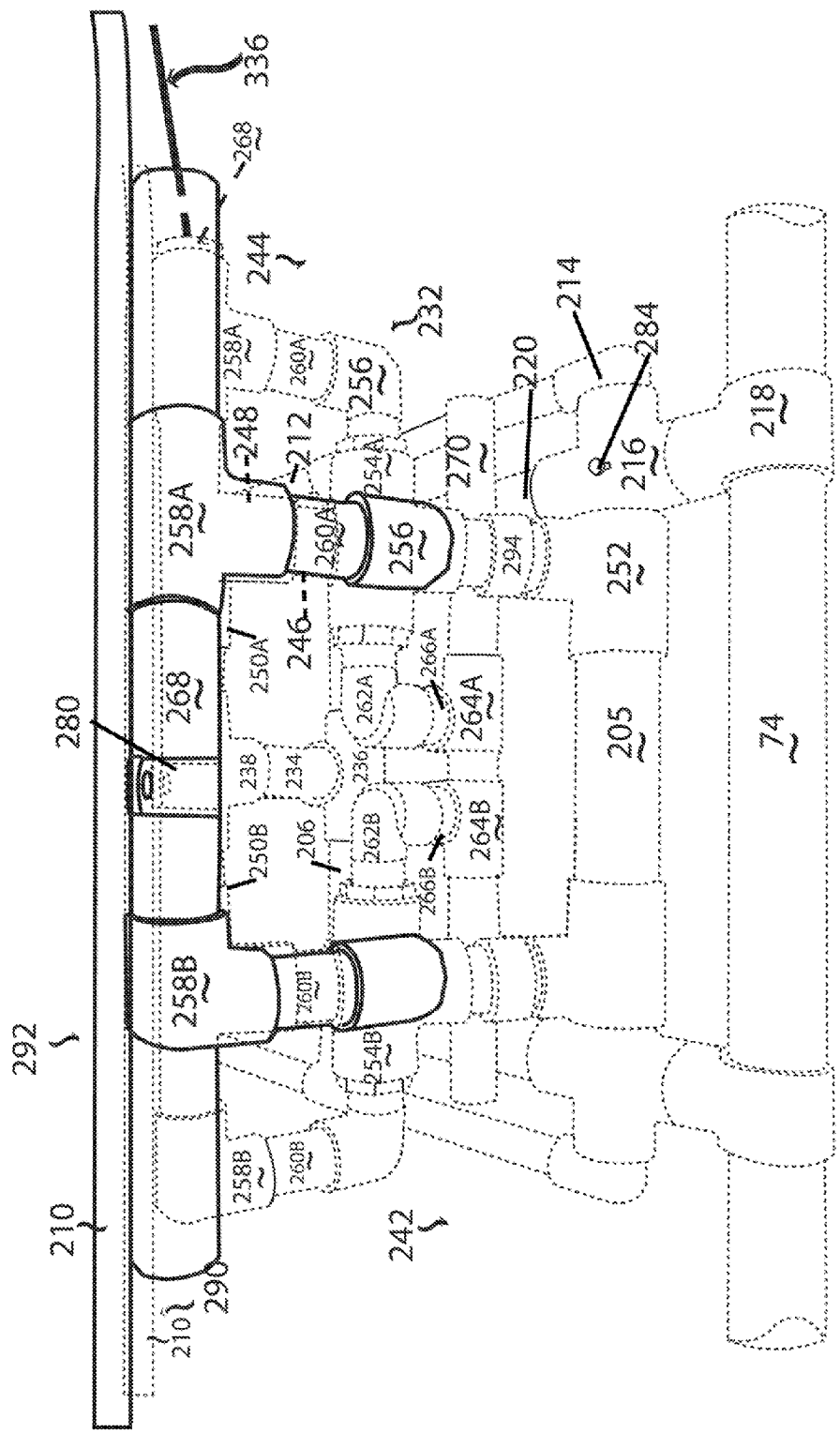
Figure 19:
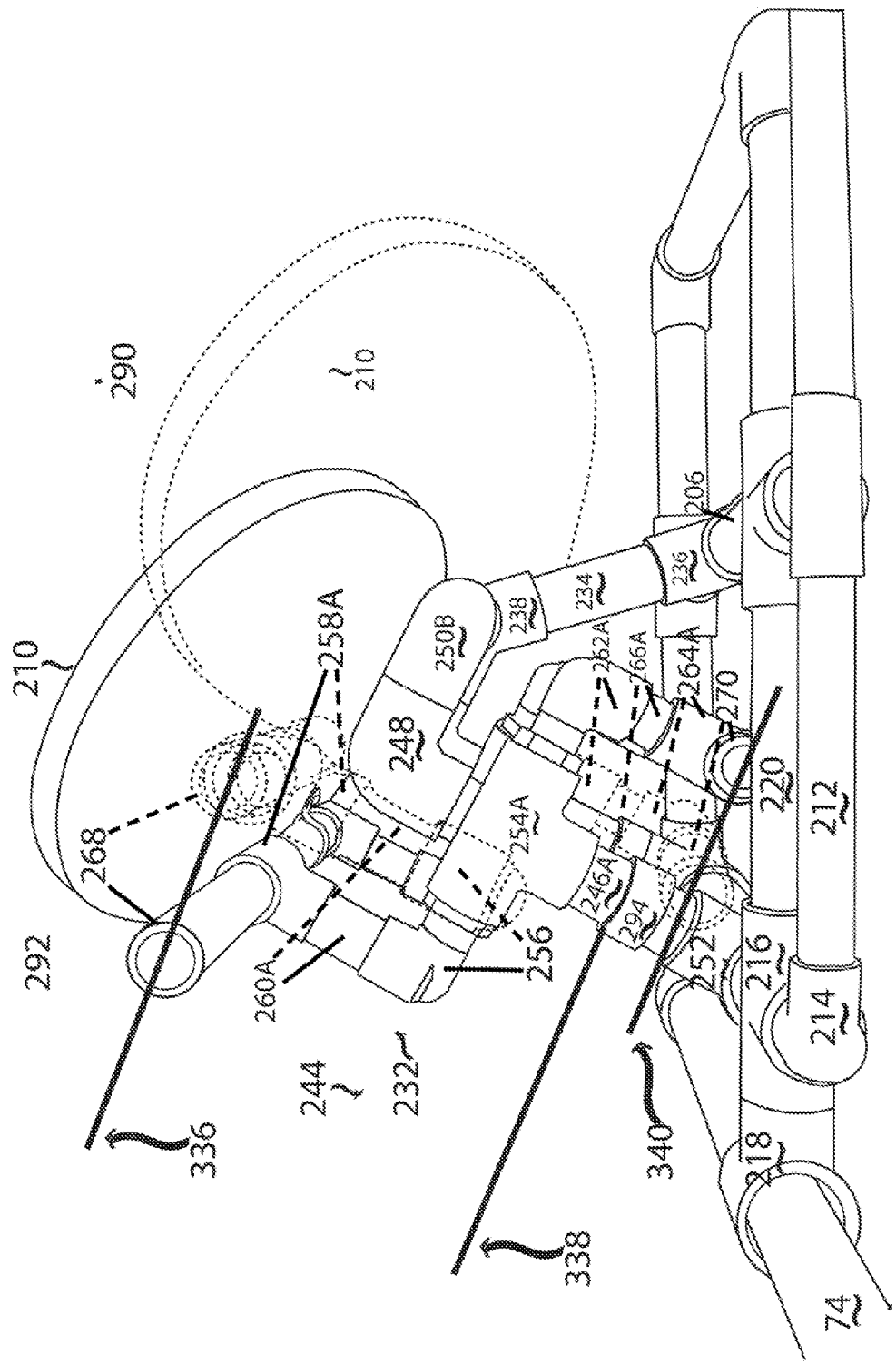

FIG. 18 shows a rear view of apparatus in position 290 and 292, with apparatus in position 290 shown in dotted line, with superimposed view of salient parts of apparatus in position 292 in bold lines FIG. 19 shows a side view of apparatus in position 290 and 292, with salient parts of apparatus in position 290 shown in dotted line and superimposed onto apparatus in position 292 in bold lines

DRAWINGS

Reference Numerals

- 30 Rowing Rig
- 32 Watercraft
- 34 Rowing seat
- 36 Base foundation
- 50 Gunwale connection
- 56 Front base member
- 60 Front 90 degree fitting
- 74 Rear base member
- 90 Watercraft inside sidewall
- 190 U bolt
- 192 V housing
- 194 Front (A) and Rear (B) Wingnut
- 96 Shims (A, B, C)

Foot Rest Hereon:

- 200 Foot rest system
- 202 FR Outside rail system
- 204 Inside Rail system
- 205 Static Cross Member
- 206 FR moving cross member
- 208 FR recline system
- 210 Foot board
- 212 FR outside rail member
- 214 FR first 90 degree fitting
- 216 FR first cross fitting
- 218 FR Base fitting
- 220 FR Side member
- 222 FR Cross member 90 degree fitting
- 224 FR second cross fitting
- 226 Fr outside rail 90 degree fitting
- 228 Board support system
- 230 Bracing system
- 232 Kick out system
- 234 Bracing member
- 236 First bracing fitting
- 238 Second bracing fitting
- 240 Bridge member
- 242 Left side of board support system
- 244 Right side board system
- 246 Support member
- 248 BS first 90 degree fitting
- 250 BS second 90 degree fitting
- 252 BS base fitting
- 254 Right (A) and Left (B) KO Cross fitting
- 256 KO first 90 degree fitting
- 258 Right (A) and Left (B) Board tee fitting
- 260 Right (A) and Left (B) First threaded member
- 262 Anti tilt second 90 degree fitting
- 264 Right (A) and Left (B) Anti tilt tee fitting
- 211 Line Perpendicular to Footrest
- 285 Lower Angled position
- 266 Right (A) and Left (B) second threaded member
- 268 First sliding member
- 270 Second sliding member
- 280 'C' shape attachment strap
- 282 FR first wirelock pin
- 284 FR second wirelock pin
- 336 Too Parallel Line
- 338 Line normal to Support member
- 340 Bottom Parallel Line
- 286 Raised but angled position
- 288 Flat position
- 290 Reverse angle but forward position
- 292 Reverse angle but rearward position
- 294 Second set of shims
- 296 First swing out position
- 298 Second swing out position
- 300 Gunwale
- 302 Top (A) and Bottom (B) wheel
- 304 Housing
- 306 Spring
- 308 Eyebolt
- 310 Center bearing wheel and Yoke
- 312 C shape guides
- 314 Suspended device
- 316 Operator
- 318 Self centering feature
- 320 Right (A) and Left (B) armature
- 322 Right (A) and Left (B) SC tee fitting
- 324 Right (A) and Left (B) SC 45 degree fitting
- 326 Right (A) and Left (B) SC side leg
- 328 Right (A) and Left (B) SC 90 degree fitting
- 330 SC bridge
- 332 Right (A) and Left (B) SC Bolts
- 334 Right (A) and Left (B) SC nuts
- 340 Bottom Parallel Line
- 223 Coupling member

SUMMARY

Embodiments

In some aspects, an apparatus configured to be used in conjunction with a footrest (210) is disclosed. The apparatus includes a first fitting unit (254A) comprising a first connector and a second connector, the first connector and the second connector being spaced between 75 and 105 degrees apart, the first connector being coupled with a first support member (246) for connecting the apparatus to a first support unit, the second connector being coupled to a second fitting unit (256). The apparatus includes the second fitting unit comprising a third connector and a fourth connector, the third connector and the fourth connector being spaced between 75 and 105 degrees apart, the third connector being coupled to the second connector of the first fitting unit, the fourth connector being coupled to a third fitting unit (258A). The apparatus includes the third fitting unit comprising a fifth connector and a sixth connector, the fifth connector and the sixth connector being spaced between 75 and 105 degrees apart, the fifth connector being coupled to fourth connector of the second fitting unit, the sixth connector being configured to be connected to a sliding member (268).

Optionally, the sixth connector is slidably connected to the sliding member, wherein the sliding member is slidably connected to an attachment strap, and wherein the attachment strap is connected to the footrest.

Optionally, the footrest is configured to adjust a position of the footrest in response to a user action.

Optionally, the user action comprises adjusting one or more wirelock pins or one or more shims.

Optionally, the position of the footrest is configured to be selected by, by a user, from among at least a first position, a second position, and a third position, a line perpendicular to the footrest at the first position being separated from a line perpendicular to the footrest at the second position by between 30 and 60 degrees, the line perpendicular to the footrest at the second position being separated from a line perpendicular to the footrest at the third position by between 30 and 60 degrees, and the line perpendicular to the footrest at the first position being separated from the line perpendicular to the footrest at the third position by between 60 and 120 degrees.

Optionally, the first support unit is connected to a watercraft via a base unit.

Optionally, the sixth connector is connected to the sliding member at a first end of the sliding member, wherein the sliding member comprises the first end and a second end, wherein a composition resides at the second end of the sliding member. The composition includes a fourth fitting unit (254B) comprising a seventh connector and an eighth connector, the seventh connector and the eighth connector being spaced between 75 and 105 degrees apart, the seventh connector being coupled with a second support member (246) for connecting the composition to a second support unit, the eighth connector being coupled to a fifth fitting unit (256). The composition includes the fifth fitting unit comprising a ninth connector and a tenth connector, the ninth connector and the tenth connector being spaced between 75 and 105 degrees apart, the ninth connector being coupled to the eighth connector of the fourth fitting unit, the tenth connector being coupled to a sixth fitting unit (258B). The composition includes the sixth fitting unit comprising an eleventh connector and a twelfth connector, the eleventh connector and the twelfth connector being spaced between 75 and 105 degrees apart, the eleventh connector being coupled to the tenth connector of the fifth fitting unit, the twelfth connector being configured to be connected to the sliding member (268) at the second end of the sliding member.

Optionally, the sixth connector comprises a hole for accepting the sliding member.

Optionally, the first connector is slidably and revolvably coupled with the support member.

Optionally, the second fitting unit is revolvably coupled with the first fitting unit.

Optionally, the second fitting unit is coupled to the third fitting unit via a threaded protruding member (260A).

In some aspects, an apparatus configured to be used in conjunction with a footrest is disclosed. The apparatus includes a first fitting unit (254A) comprising a first connector and a second connector, the first connector and the second connector being spaced between 75 and 105 degrees apart, the first connector being coupled with a first support member (246), the second connector being coupled to a second fitting unit (combination of 262A and 266A). The apparatus includes the second fitting unit comprising a third connector and a fourth connector, the third connector and the fourth connector being spaced between 75 and 105 degrees apart, the third connector being coupled with the second connector of the first fitting unit, the fourth connector being coupled with a third fitting unit (264A). The apparatus includes the third fitting unit comprising a fifth connector, the fifth connector being configured to slidably connect to an elongated member (270).

Optionally, the first support member is configured to connect with a footrest, and wherein a force applied to the footrest does not result in a tipping, a tilting, or a twisting of the first fitting unit.

Optionally, the footrest is configured to be moved in a direction between 75 and 105 degrees relative to a longitudinal axis of the first support member (246) in response to a turning inward or outward of the first fitting unit.

Optionally, the elongated member is slidably connected to the fifth connector, and wherein the elongated member is connected to a composition. The composition includes a fourth fitting unit (254B) comprising a sixth connector and a seventh connector, the sixth connector and the seventh connector being spaced between 75 and 105 degrees apart, the sixth connector being coupled with a second support member (246), the seventh connector being coupled to a fifth fitting unit (combination of 262B and 266B). The composition includes the fifth fitting unit comprising an eighth connector and a ninth connector, the eighth connector and the ninth connector being spaced between 75 and 105 degrees apart, the eighth connector being coupled with the seventh connector of the fourth fitting unit, the ninth connector being coupled with a sixth fitting unit (264B). The composition includes the sixth fitting unit comprising a tenth connector, the tenth connector being configured to slidably connect to the elongated member (270).

Optionally, the fourth connector comprises a revolvable connector and the ninth connector comprises a revolvable connector.

Optionally, an opening between the first support member and the second support member is configured to accept an armature (318) for centering the footrest when moving between positions of the footrest.

In some aspects, an apparatus configured to be used in conjunction with a footrest is disclosed. The apparatus includes a first fitting unit (combination of 206, 224, and 226) configured to slidably engage and lock a first elongated member (212) and to slidably engage a second elongated member (220). The apparatus includes a third elongated member (combination of 234 and 236) rotatably connected to the first fitting unit and pivotally connected to a fourth supporting member, the fourth supporting member (combination of 252, 246, 248, 250, 238, 240) providing support for the third elongated member. The apparatus includes a fifth elongated member (combination of 214, 216 and 205), the fourth supporting member being revolvably connected to the fifth elongated member (at 252), the fifth elongated member being configured to slidably engage and lock the second elongated member.

Optionally, the fifth elongated member is configured to slidably engage the second elongated member at a plurality of positions, and wherein the second elongated member is coupled to a base member (74) via a second fitting unit (218).

Optionally, the apparatus is coupled to a companion apparatus, the apparatus and the companion apparatus being symmetric relative to at least one axis, wherein the apparatus and the companion apparatus reside within a watercraft, wherein the apparatus is configured to accept a first foot of a user, and wherein the companion apparatus is configured to accept a second foot of the user.

Detailed Description

First Embodiment—Foot Rest, FIGS. 5-14

This right side teaching is repeated for the left side of the figures, and vice versa, as the embodiment is symmetrically identical on both sides where applicable, with the right side optionally coupled to the left side by a Coupling member 223, with the part callout having an 'A' sub part name for the Right side, and 'B' for the Left side for teaching purposes. Whenever there is no subpart name, it is assumed the right side for left side teaching and vice versa is still preserved.

Figure 1:
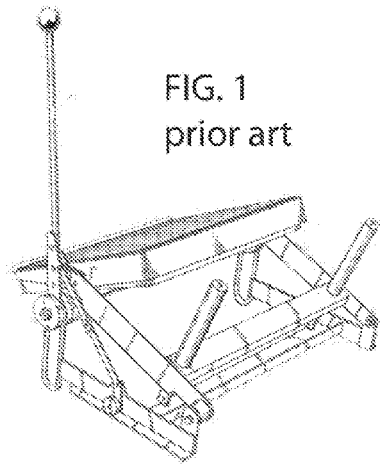
FIG. 1 is Prior Art, Lemmer's embodiment.
Figure 2:
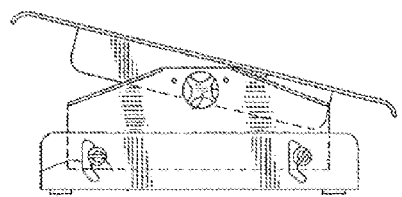
FIG. 2 is Prior Art, Jacobson et al's embodiments.
Figure 3:
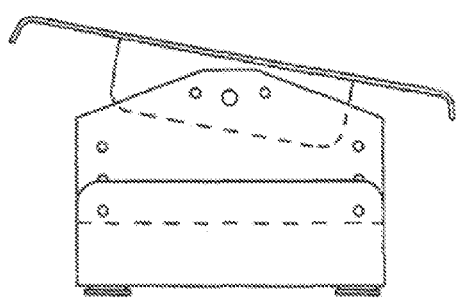
FIG. 3 is Prior Art, Hatcher's embodiments.
Figure 4:
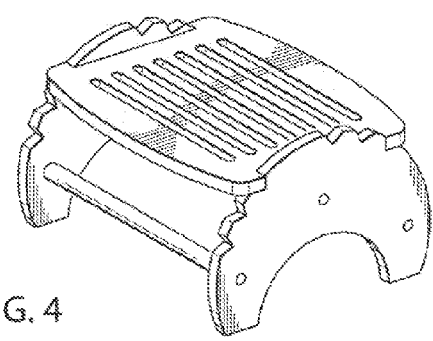
FIG. 4 is Prior Art, Barr's embodiments.
Figure 5:
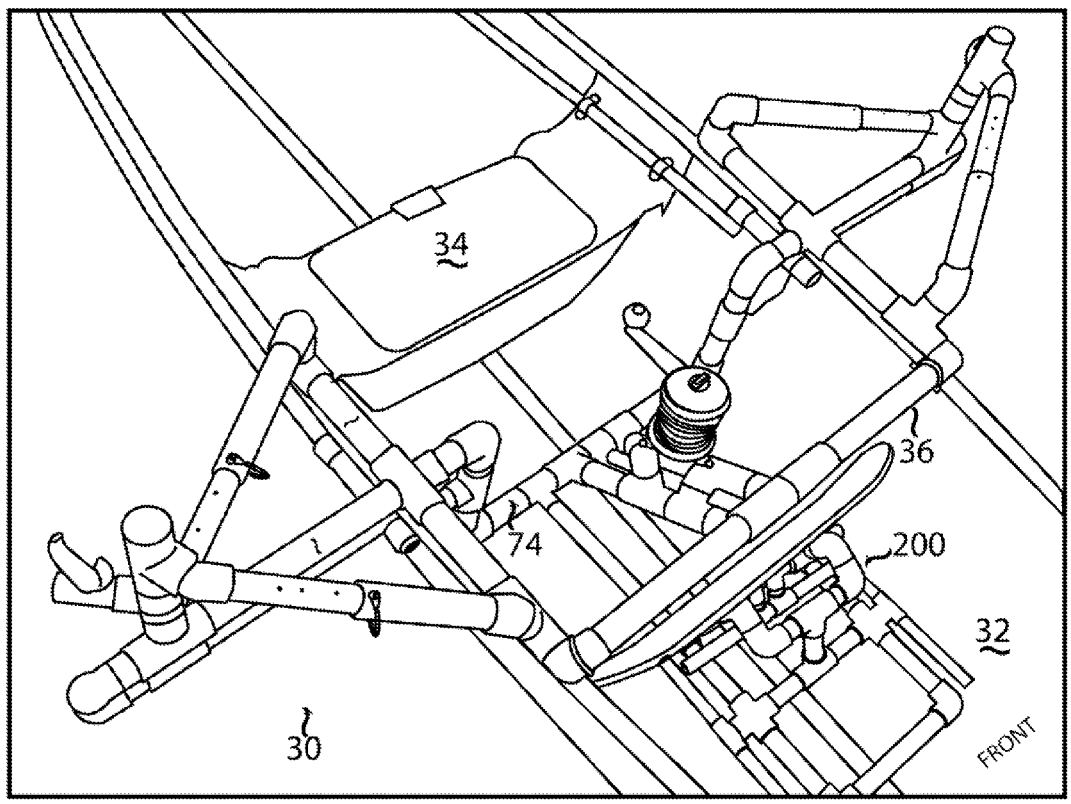
FIG. 5 is a front isometric view of the embodiment in a watercraft
Figure 7:
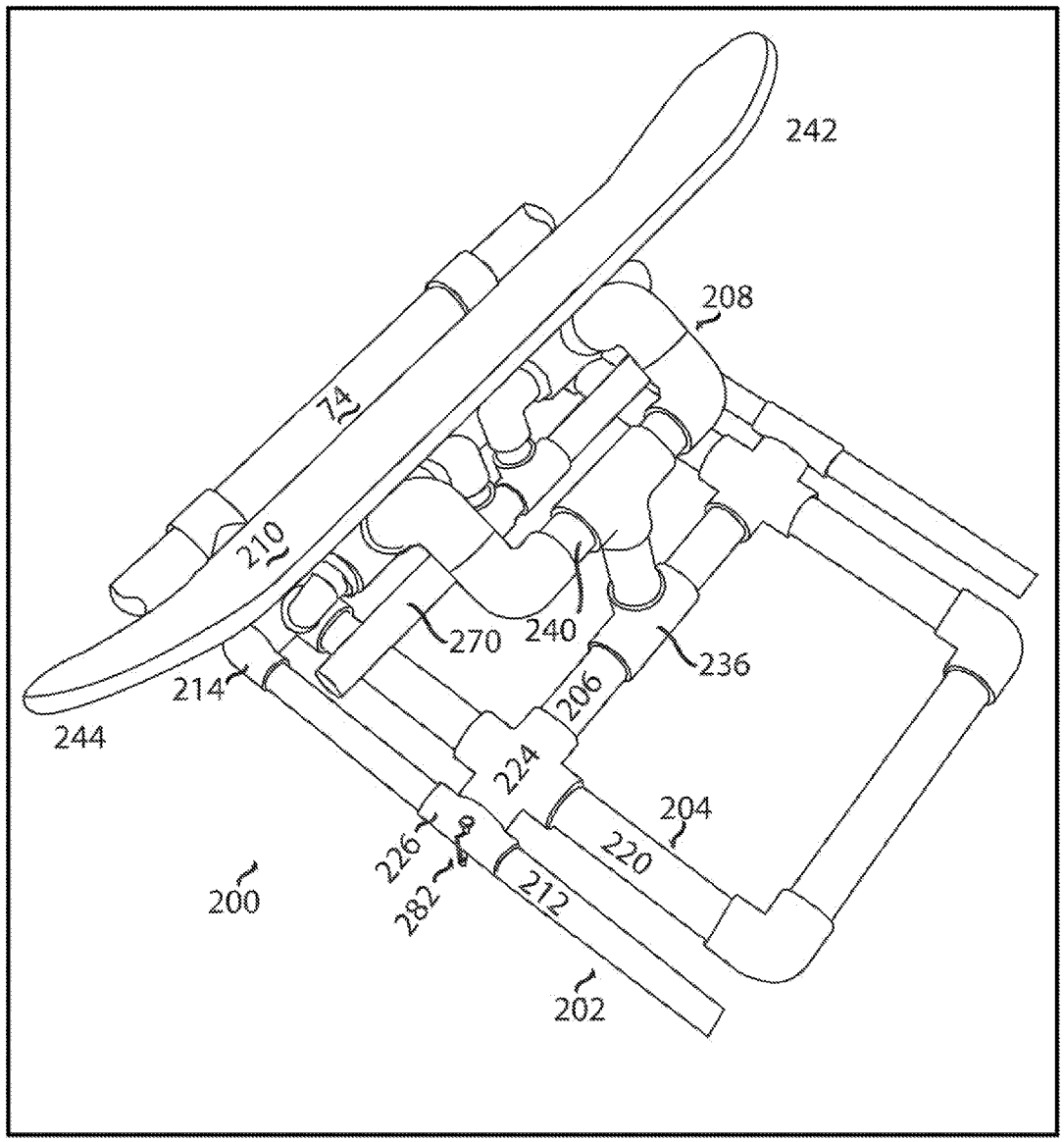
FIG. 7 is a isometric view of the Foot Rest system

With reference to FIG. 5, the footrest 200 is connected to the rowing rig 30 (U.S. patent application Ser. No. 13/149, 385, entitled "ROWING RIG," filed on May 31, 2011 by the present inventor) by connecting to rear base member 74 of said rig. With reference to FIG. 7, the foot rest system 200 comprises mainly of an FR outside rail system 202, FR inside rail system 204, and FR static cross member 205 (better shown in FIG. 8), an FR moving cross member 206, a FR recline system 208, and a foot board 210.

Right side 244 of the Foot Rest 200 contains the same elements, functionality, and operations as Left side 242 of Foot Rest. To avoid redundancy, all descriptions for the Right side equally applies to the Left side, and vice versa, except for elements not reflected around the center line.

Figure 8:
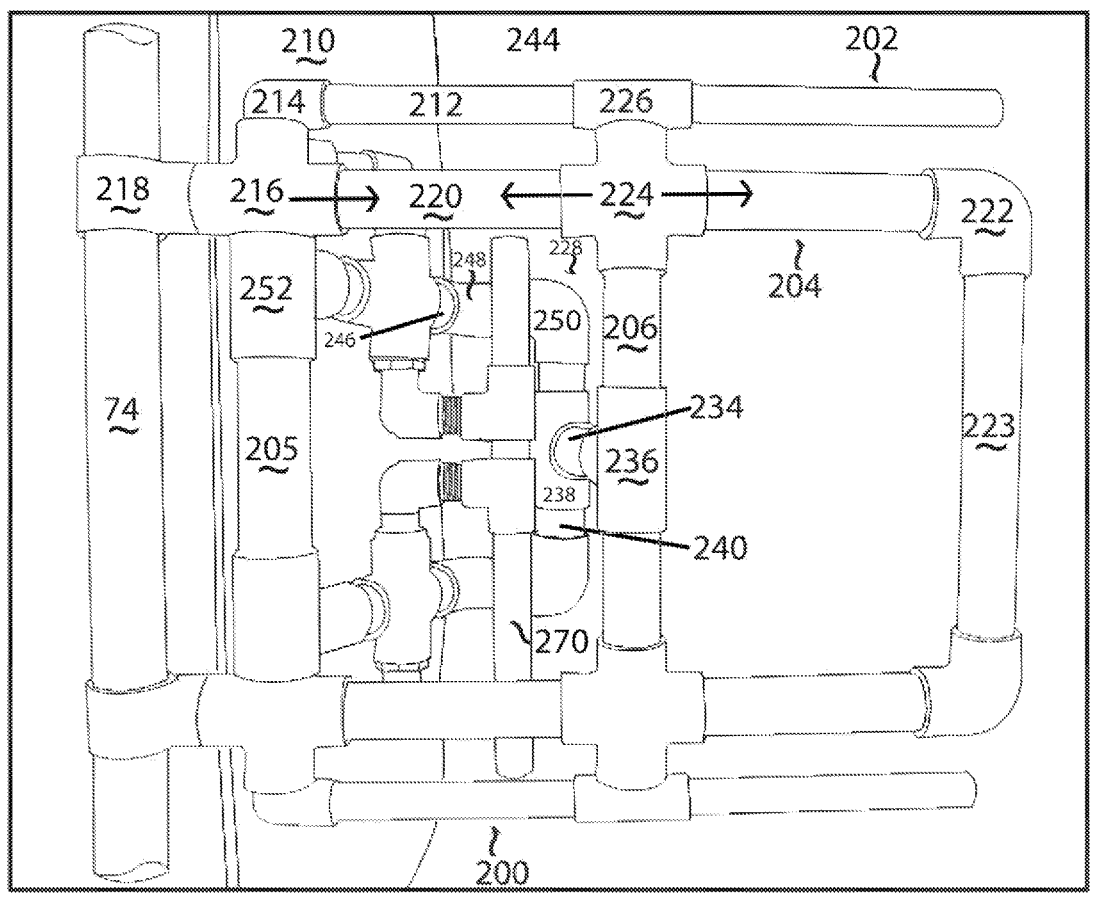
FIG. 8 is a bottom view of Foot Rest system

With reference to FIG. 8, FR outside rail system 202 comprise of FR outside rail member 212 connected to FR first 90 degree fitting 214. Fitting 214 is connected to FR first cross fitting 216 (of which 216 connects to Static Cross Member 205 mentioned earlier) that slidably engages with FR side member 220 that is described in greater detail further in this section. The members 212 and 205 and fittings 214 and 216 connected together in a non-moving manner constitute the First Elongated Member. Fitting 214 is connected to FR first cross fitting 216 that slidably engages with FR side member 220 that is described in greater detail further in this section. FR Side member 223 connects to FR Base fitting 218, where member 220 and fitting 218 constitute Second Elongated Member that revolvably connects to rear base member 74, completing the FR outside rail system 202 connection to Rowing rig 30.

FR inside rail system 204 comprise of a FR side member 220 that connects to FR base fitting 218 on one end, with the other end connecting to FR Cross member 90 degree fitting 222.

FR moving cross member 206 connects both inner 204 and outside 202 rail system by having 1) having one end of member 206 connect to FR second cross fitting 224 that slidably engages with side member 220, and 2) fitting 224 connected to FR outside rail 90 degree fitting 226 that slidably engages with outside rail 212 (where the member 226 and fittings 224 and 226 connected together in a non moving manner constitutes Seventh Fitting Unit).

With respect to FIG. 9, The FR recline system 208 comprises of a Board support system 228, a Bracing system 230, and a Kick out system 232.

The Bracing system 230 comprise of a bracing member 234 connected to FR moving cross member 206 by having one end connected to first bracing fitting 236 that is revolvably connected to cross member 206. With respect to FIG. 8, the other end of bracing member 234 is connected to second bracing fitting 238 that is revolvably connected to Bridge member 240 (where the member 231 and fittings 236 and 238 connected together in a non-moving manner constitute Third Elongated Member). With respect to FIG. 11, bridge member 240 connects the left side 242 of board support system 228 to right side board system 244.

With respect to FIG. 8 and FIG. 9, the Board support system 228 comprise of Support member 246 connected to bridge member 240 by having one end connected to BS first 90 degree fitting 248. BS second 90 degree fitting 250 has one end connected to fitting 248 and the other end connected to bridge member 240. The support member 246 other end is connected to BS base fitting 252 that revolvably engages with FR static cross member 205 (shown in FIG. 8). Fitting 252 is also revolvably engaged with fitting 216. These members 246 and 240 and fittings 248, 250, and 252 connected together in a non-moving manner constitute supporting Member.

With respect to FIG. 12, the Kick out system comprises of KO Cross fitting 254 that slidably and revolvably engages with support member 246. A KO first 90 degree fitting 256 is revolvably connected to fitting 254. Board tee fitting 258 is revolvably connected to fitting 256 with first threaded member 260 connecting to both fittings 258 and 256. An anti tilt second 90 degree fitting 262 is revolvably connected to cross fitting 254. Anti tilt tee fitting 264 is revolvably connected to fitting 262 with second threaded member 266 connecting to both fittings.

The two sides 242 and 244 are further connected to each other with fittings 258 A and B slidably connected to first sliding member 268, and fittings 264 A and B slidably connecting to Second sliding member 270. Although the one end of the sliding member 268 is shown to be coupled to fitting 258B in a non sliding manner, this connection is shown as a functional equivalent to the sliding version above since it is possible for fitting 258A to accommodate all of member 268 sliding to remove any binding during the operation.

With reference to FIG. 16, foot board 210 is connected to first sliding member 268 by a 'C' shape attachment strap 280 that slidably and revolvably engages with member 268 and is fastened to foot board 210.

This locks the angle foot board 210 angle to the horizon. A line perpendicular to the footrest (211) is shown in FIGS. 9, 10, and 15 as to describe this angle to the horizon.

With reference to FIG. 12, FR second wirelock pin 284 is passed through holes featured in both fittings 216 and member 220. With reference to FIG. 9, this locks the Board support system 228, Bracing system 230, and Kick out system 232 from travelling fore and aft.

With reference to FIG. 14 and embodiments in U.S. patent application Ser. No. 13/149,385, entitled "ROWING RIG," filed on May 31, 2011 by the present inventor, rowing rig 30 is further connected to watercraft 32 by gunwale connection 50, comprising of U bolt 190 passing over front base member 56, with both ends of bolt passing through a V housing 192 and held in place with wingnuts 194A and B. The housing 192 engages with front member 56 and with a corner defined by gunwale 300 and inside sidewall 90. This gunwale connection is needed to counteract the forces caused when the foot rest system 200 is under operation.

Operation: Foot Rest: FIGS. 6 to 14

With reference to FIG. 12, the fore and aft location of foot board 210 is adjustable by removing wirelock pin 284, and sliding fitting 216 fore and aft until a desired and new location on member 220 that has both fitting and member holes lined up. Lock down this new foot board 210 location by passing wirelock pin 284 through this set of holes.

With reference to FIG. 7, the angle of the foot board is adjustable by removing wirelock pin 282 and sliding fitting 226 fore and aft until a desired and new location on member 212 that has both fitting and member holes lined up. Lock down this new foot board 210 angle by passing wirelock pin 282 through this set of holes.

With reference to FIGS. 9 and 10, a sequence of 5 deployed positions are shown to show the full extent the foot board 210 sequencing from the Lower Angle position (285) shown in FIG. 7 to a raised but angle position 286, a flat position 288, a reverse angle but forward position 290, and a reverse angle but rearward position 292 (shown in FIG. 10). With reference to both figures, a Line perpendicular to the footrest (211) show the angles between the line at these positions are separated between 30 and 60 degrees between position 285 or 286 and 288 or 290, and between 60 and 120 degrees between positions 285 or 286 and 292.

Figure 6:
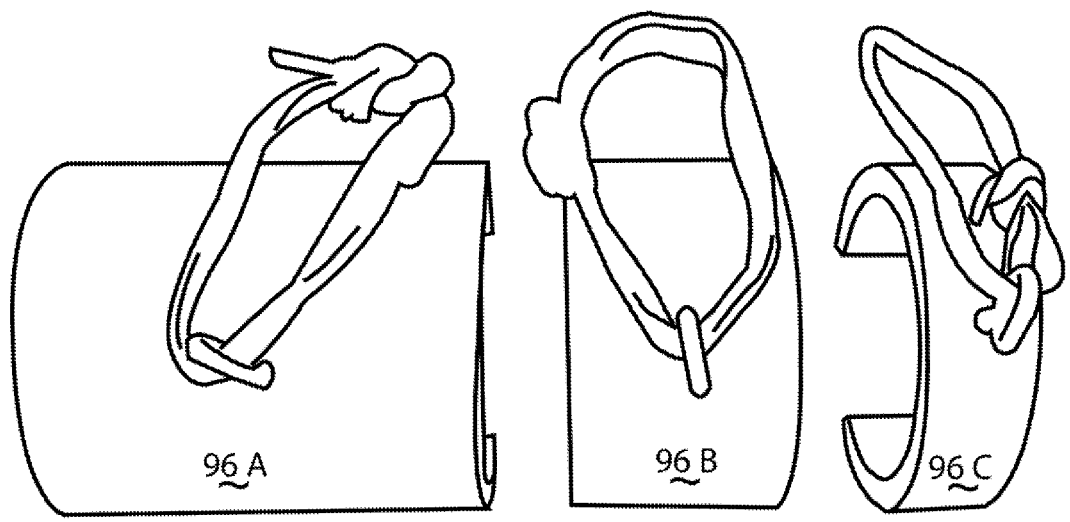
FIG. 6 is a front view of Shims of varying lengths

With reference to FIG. 9, a raised but angled position 286 is quickly achieved by raising fitting 254 and snapping in second set of shims 294 that is identical to shims 96A, B, and C (see FIG. 6, also referenced in embodiments described in U.S. patent application Ser. No. 13/149,385, entitled "ROWING RIG," filed on May 31, 2011 by the present inventor) onto support member 246 on either sides of fitting 254. Fitting 254 is trapped from sliding on member 246 by using a combination of shims 96A, B, C on either side of fitting 254 that entirely covers the exposed surfaces of member 246.

With Reference to FIG. 9, a flat top position 288 is achieved similarly as with position 286 using shims 294 in a combination that raises and traps fitting 254 high enough so that foot board 210 is resting on the top of fitting 248 in a flat manner. Additionally, member 268 swings out around fitting 254 to first swing out position 296.

With Reference to FIG. 9, a reverse angle but forward position 290 is achieved similarly as with position 288 using shims 294 in a combination that raises and traps fitting 254 even more high enough so that foot board 210 is resting on the top of both fittings 248 and 250 and in a reverse-angle-but-forward manner. Additionally, member 268 swings out and rotates further clockwise around fitting 254 to a second swing out position 298.

With Reference to FIG. 10, a reverse angle but rearward position 292 is achieved starting with the reverse angle but forward position 290 shown in FIG. 9. With reference to FIG. 9, starting with this 290 position, member 270 is lowered until it touches member 246. With additional reference to FIG. 12, fitting 254 is turned by 90 degrees with fittings 262 moving forwards in the watercraft (into the page). During the procedure of creating position 292 from 290, the Kick out system 232 will automatically and passively remove any binding, allowing fittings 264A and B to revolve around members 266 A and B respectively, and fittings 258 A and B to revolve around members 260 A and B respectively. Additionally, kick out system 232 allows member 270 to slide in fittings 264 A and B, and member 268 to slide in fittings 258 A and B and in 'C' shape attachment strap 280. This turning of fittings 254A and B by 90 degrees then moves the foot board 210 rearward to this new rearward but reverse angle position 292, better seen in FIG. 10.

With reference to FIG. 5, because the foot rest 200 is a connected part to the rear base member 74, any fore and aft adjustment in the Rowing Rig 30 relative to the watercraft 32 will also cause similar fore and aft changes to the foot rest system 200 position relative to watercraft 32. This foot rest adjustment still preserves the foot board's 210 angle or position relative to rear base member 74. This preservation may be beneficial to certain setup changes where changes to the distance between 1) foot board 210 and row seat 34, and between 2) rear base member 74 to row seat 34, are one the same.

Additionally, this is even more beneficial when rowing rig (30) is configured to slidably travel fore and aft on the watercraft 32. Because fitting 224 is adjustably locked into a predetermined distance from fitting 216 (by means of the outer rail 202 fitting 226, member 212 fitting 214 and wirelock 2821 that travels with fitting 216). By locking down fitting 216 onto member 220, this also immobilizes fitting 224 onto member 220 (without the need to lock fitting 224 down onto member 220). The benefit here is the Tilt Angle of the board, determined by the Line perpendicular to the footrest 211, can remain as an independent adjustment, separate from the Fore-Aft adjustment accomplished from fitting 216 slidably engaging with member 220 in a removably locking manner.

With reference to FIG. 9, for all foot board positions other than position 292, Kick out system 232 is positioned in the manner where the longitudinal axis of threaded members 266A and B are about perpendicular to the longitudinal axis of support member 246. Since second sliding member 270 is also coupled to support member 246B, in this position the fitting 254A is unable to rotate around support member 246A as this rotation is constrained due to the binding conditions in this position. This is to ensure that an uneven or unbalance force applied to board 210 will not result in tipping the board from having the side with the lesser force lift away from the board support system 228.

Description

Alternative Embodiment FIG. 13-16

Foot Rest: Alternative Embodiment to Bridge Member 240 Connection to BS First 90 Degree Fitting 248.

With reference to FIGS. 11 and 15, bridge member 240 can connect directly to BS first 90 degree fittings 248A and B, eliminating the need for BS second 90 degree fittings 250A and B. This alternative embodiment simply requires fittings 248 A and B to rotate 90 degrees towards the center of the foot rest 200, bracing member 234 to be elongated in length until both ends of member 240 fit and connect into fittings 248A and B.

Hence the need for kick out system 232 is even more important with this alternative embodiment in order for the footboard 210—now in reverse angle but rearward position 292 in FIG. 10- to be supported in a robust way with the front edge of the foot board 200 touching down on fitting 248A and B.

Foot Rest: Addition of Self Centering Feature to Keep Foot Board Centered.

With reference to FIGS. 16 and 17, a self centering feature 318 may be attached to the foot board 210 to keep foot board centered during the operation. The feature 318 comprise of a right and left armature 320 A and B respectively. Both armatures are connected together by armature bridge 330. The teachings for right armature is identical to the left armature and vice versa, requiring a teaching for the right side only to avoid redundancy.

Right armature 320A comprise of a SC tee fitting 322A connected to foot board 210, with said fitting tee end connected to SC 45 degree fitting 324A. A SC side member 326A connects to the fitting 324A on one end, and to a SC 90 degree fitting 328A on the other end. Bridge 330 connects to fitting 328A.

With reference to FIGS. 16 and 17, fitting 322A and B slidably engages with sliding member 268 whose previous connections are described above. With reference to FIG. 13, the feature 318 fits inside the U shape opening defined by support members 246A and B, and member 205. The feature 318 keeps foot board 210 centered by having members 326A and B staying inside this U shape opening while cycling between all positions, at the same time without interfering the operations of the kick out system 232.

With reference to both FIGS. 18 and 19, one end of the first sliding member 268 can travel along a top straight line 336 passing through the centers of the one end of the sliding member 268 when cycling the foot rest between positions 290 and 292 from which member 268 moves towards and away from support member 246. The end distance of member 268 from fitting 258A is selectively adjustable by the operator since member 268 slides through strap 280 and Board tee fittings 258A and B. The top straight line 336 is substantially parallel and substantially equidistant to a line 338 normal to the longitudinal axis of the support member 246 as well as transverse to the support member 246. The longitudinal axis of sliding member 268 remains substantially normal to the to straight line 336 when cycling between positions.

Also with reference to the second sliding member 270 shown in both FIGS. 18 and 19, one end of the second sliding member 270 can travel along a bottom straight line 340 passing through the centers of the one end of the sliding member 270 when cycling the foot rest between positions 290 and 292, from which member 270 moves towards and away from support member 246. The end distance of fitting 270 from fitting 264A is selectively adjustable by the operator since member 270 slides through Anti Tilt tee fittings 264A and B. This bottom straight line 340 is substantially parallel and substantially equidistant to a line 338 normal to the longitudinal axis of the support member 246 as well as transverse to the support member 246. The longitudinal axis of second sliding member 270 remains substantially normal to the bottom straight line 340 when cycling between positions.

CONCLUSIONS, RAMIFICATIONS, AND SCOPE FOR FOOTREST

From the description above, a number of advantages of some embodiments of my footrest become evident:
1. The footrest 200 solves the ability to adjust a footrest in the fore-aft, vertical, and multi angle positions in an independent manner for varying rower builds.
2. The footrest 200 solves the ability to provide meaningful adjustment range within each adjustment, and the ability to resist the high bracing foot forces rower imparts onto footboard 210 under rowing pressure; both adjustments found in and load forces transmitted majorly along FR outside rail system 202, FR inside rail system 204, FR static cross member 205, and FR moving cross member 206.
3. The footrest 200 solves the ability to provide a footrest setting to row the boat ergonomically with the wide and varied adjustments captured above, but also in having the footboard 210 travel and trapped along member 246 for a higher footboard action 286.
4. The footrest 200 solves the ability to perform such adjustments without any tools or high need for skill and training, using the wirelock pins 282 and 284 that locks down their adjacent fittings into the adjacent members respectively, and using shims 294 to raise and trap the footboard 210 in varying height locations.
5. The footrest 200 solves the ability to perform such adjustment without incurring any time-consuming downtime such as mooring, again using the wirelock pins 282 and 284 that locks the adjacent fittings into the adjacent members respectively, and using shims 294 to raise the footboard 210.
6. The footrest 200 solves the ability to recall prior locations in a highly reproducible and repeatable way, through the use of wirelock pins 282 and 284 and shims 294.
7. The footrest 200 solves the ability to fit the art into a canoe of limited real estate from having fixed seats and to function with these fixed seat 34.
8. The footrest 200 solves the ability to not deform a plastic canoe under rowing operation by transmitting the downward and forward rowing loads via rowing rig 30 and into a vertical axis direction that is secured to gunwale 300 via clamp system 50.
9. The footrest 200 solves the ability to multi function such as a picnic table and leg rest, with kick out system 232 that allows positions 288 for picnic table use and 290 for leg rest.
10. The footrest 200 solves the ability to be accessible and within ergonomic reach from a seated rowing position without impeding other functions such as rowing, with the use of wirelock pins 282 and 284 and shims 294 that located rearward enough and thus closer to rower's range of access.
11. The footrest 200 allows uneven application of footrest force with the kick out system 232 having an anti tipping feature that prevents fittings 254 A and B from rotating, a feature that does not bind when operating at all ranges from, and within itself, positive angle, to horizontal angle, to negative angle.

Ramifications:

Although the embodiments show connections (such as fitting 226 connecting to fitting 224 in FIG. 8) connecting non moving members together, these members can be coupled together by other methods such as welding, epoxy gluing, wrapping, etc. This eliminates the plurality of connections themselves, reducing the assembly complexity (less elements), reducing the weight, as well as cost. Additionally, a connection can be made integral to a member communicating with it in a static way when coupled together. An example of integration is injection molding the 90-degree fitting 238 onto front member 234 in FIG. 9. Additionally, the fitting can be wholly eliminated if a member can be bent in the same shape as outlined by an assembly of members and connections, such as making L shape configuration defined by fitting 262 and member 266 in FIG. 12.

The front base member 56 of rowing rig 30 may be further secured onto watercraft 32 by providing an attaching front base member 56 onto the gunwale 300 using a gunwale connection 50 as show in FIG. 14. This connection is loosened up before rig 30 can move fore and aft before being locked back down in place. This securing member 56 to gunwale 50 is even more important when rowing rig 30 is operating with foot rest 200 attached to it as show in FIG. 5. This connection 50 counteracts any fore and aft and downward forces applied to foot rest 200.

With reference to FIG. 12, fitting 264 connection to member 266 can be made simpler and less complicated with an annular groove in member 266 locking into an annular locking ring in fitting 264, as well as a reverse role arrangement, so as to accomplish this rotatable connection.

Additionally, screws may be added to further secure coupled parts that are non-moving when coupled together.

Additionally, front base member 56 can be a 'V', or other similarly shaped support, sometimes with a dip inside the watercraft 32. This change allows better stowage further below the horizontal surface defined from gunwale to gunwale or sometimes improved leg clearances to the foot rest 200, especially in the reverse angle positions 290 and 292.

Additionally, the rowing rig 30, along with footrest 200, can be installed backwards with the rower facing the rear of the watercraft 32.

Additionally, a wire and locking pulley system—a known art in ships—may be used instead of the shims 264 and wirelock pins 282 and 284. This would be a more convenient—although more costly design—to quickly adjust and then lock down footboard 210 adjustment position.

Additionally, the use of shims 264; and wirelock pins 282 and 284, can be completely eliminated if a servo motor or a like changes the adjustments controlled by these shims and pins. And that this proposed device either has a locking means, or is strong enough to keep these adjustments fixed under rowing stress transmitted to it.

While the above description contains many specificities, these should not be construed as limitations on the scope of any embodiments, but as illustrations of various embodiments thereof. Many other ramifications and variations are possible with the teachings of the various embodiments. For example, the rowing rig 30, together with footrest 200, can be mounted on any body of interest, for instance, to a tractor that has a suspended device (314) such as a pipe that has nozzles sprays along it in lieu of oar lock (element 40 in embodiments filed under U.S. patent application Ser. No. 13/149,385, entitled "ROWING RIG," filed on May 31, 2011 by the present inventor) to dispense chemicals, adjusting laterally for differing separation distances between rows of plants. Another example would be footboard 210 might be substituted with skis or a means to stabilize on snow, ice, or mud, or any other environment. Another example may be even replacing footboard 210 with pedals that control an operation directly or remotely.

Accordingly, the scope should be determined not by the embodiments illustrated, but by the appended claims and their legal equivalents.

The invention claimed is:

1. An apparatus configured to be used in conjunction with a footrest, the apparatus comprising:
  a first fitting unit comprising a first connector and a second connector, the first connector and the second connector being spaced between 75 and 105 degrees apart, the first connector being coupled with a first support member for connecting the apparatus to a first support unit, the second connector being coupled to a second fitting unit;
  the second fitting unit comprising a third connector and a fourth connector, the third connector and the fourth connector being spaced between 75 and 105 degrees apart, the third connector being coupled to the second connector of the first fitting unit, the fourth connector being coupled to a third fitting unit; and
  the third fitting unit comprising a fifth connector and a sixth connector, the fifth connector and the sixth connector being spaced between 75 and 105 degrees apart, the fifth connector being coupled to fourth connector of the second fitting unit, the sixth connector being configured to be connected to a sliding member,
wherein the sliding member comprises a first end and a second end, the first end coupled to the third fitting unit, whereby a distance between the second end of the sliding member and the third fitting unit is selectively adjustable so that the second end of the sliding member travels in a straight line substantially parallel and substantially equidistant to a predetermined line substantially normal and transverse to a longitudinal axis of the first support member, whereby a longitudinal axis of the sliding member remains substantially normal to the straight line when the second end of the sliding member travels along the straight line,
whereby the second end of the sliding member travels at least towards and away from the first support member along the straight line.

2. The apparatus of claim 1, wherein the sixth connector is slidably connected to the sliding member, wherein the sliding member is slidably connected to an attachment strap, and wherein the attachment strap is connected to the footrest.

3. The apparatus of claim 2, wherein the footrest is configured to adjust a position of the footrest in response to a user action.

4. The apparatus of claim 3, wherein the user action comprises adjusting one or more wirelock pins or one or more shims.

5. The apparatus of claim 3, wherein the position of the footrest is configured to be selected, by a user, from among at least a first position, a second position, and a third position, a line perpendicular to the footrest at the first position being separated from a line perpendicular to the footrest at the second position by between 30 and 60 degrees, the line perpendicular to the footrest at the second position being separated from a line perpendicular to the footrest at the third position by between 30 and 60 degrees, and the line perpendicular to the footrest at the first position being separated from the line perpendicular to the footrest at the third position by between 60 and 120 degrees.

6. The apparatus of claim 1, wherein the first support unit is connected to a watercraft via a base unit.

7. The apparatus of claim 1, wherein the apparatus of claim 1 is a right side embodiment, that is coupled to a left side embodiment, the left side embodiment and the right side embodiment being symmetric to at least one axis, wherein the sixth connector is connected to the sliding member at the first end of the sliding member, wherein the left side embodiment comprises a composition that resides at the second end of the sliding member, the composition comprising:
  a fourth fitting unit comprising a seventh connector and an eighth connector, the seventh connector and the eighth connector being spaced between 75 and 105 degrees apart, the seventh connector being coupled with a second support member for connecting the composition to a second support unit, the eighth connector being coupled to a fifth fitting unit;
  the fifth fitting unit comprising a ninth connector and a tenth connector, the ninth connector and the tenth connector being spaced between 75 and 105 degrees apart, the ninth connector being coupled to the eighth connector of the fourth fitting unit, the tenth connector being coupled to a sixth fitting unit; and
  the sixth fitting unit comprising an eleventh connector and a twelfth connector, the eleventh connector and the twelfth connector being spaced between 75 and 105 degrees apart, the eleventh connector being coupled to the tenth connector of the fifth fitting unit, the twelfth connector being configured to be connected to the sliding member at the second end of the sliding member,
whereby an angle defined between the longitudinal axis of the sliding member and a predetermined transverse axis of the second support member remains substantially normal when the fourth fitting unit is rotated while second support member remains stationary.

8. The apparatus of claim 1, wherein the sixth connector comprises a hole for accepting the sliding member.

9. The apparatus of claim 1, wherein the first connector is slidably and revolvably coupled with the support member.

10. The apparatus of claim 1, wherein the second fitting unit is revolvably coupled with the first fitting unit.

11. The apparatus of claim 1, wherein the second fitting unit is revolvably coupled with the third fitting unit.

12. An apparatus configured to be used in conjunction with a footrest and with a second support member, the apparatus comprising:
  a first fitting unit comprising a first connector and a second connector, the first connector and the second connector being spaced between 75 and 105 degrees apart, the first connector being coupled with a first support member, the second connector being coupled to a second fitting unit;
  the second fitting unit comprising a third connector and a fourth connector, the third connector and the fourth connector being spaced between 75 and 105 degrees apart, the third connector being coupled with the second connector of the first fitting unit, the fourth connector being coupled with a third fitting unit; and
  the third fitting unit comprising a fifth connector, the fifth connector being configured to slidably connect to an elongated member, whereby the elongated member can be positioned into a at least first position and a at least second position, the at least first position in conjunction with the second support member locking the first fitting unit from rotating around the first support member, the at least second position unlocking the first fitting unit to rotate around the first support member, wherein all members and fitting units are coupled to each other, wherein the elongated member remains continuously coupled to the second support member when cycling between positions.
wherein the elongated member comprises a first d and a second end, the first end coupled to the third fitting unit,
whereby a distance between the second end of the elongated member and the third fitting unit is selectively adjustable so that the second end of the elongated member travels in a straight line substantially parallel and substantially equidistant to a predetermined line substantially normal and transverse to a longitudinal axis of the first support member,
whereby the second end of the elongated member travels at least towards and away from the first support member along the straight line,
whereby a longitudinal axis of the elongated member remains substantially normal to the straight line.

13. The apparatus of claim 12, wherein the first support member is configured to connect with a footrest, and wherein a force applied to the footrest does not result in a tipping, a tilting, or a twisting of the first fitting unit or of the footrest.

14. The apparatus of claim 13, wherein the footrest is configured to be moved in a direction between 75 and 105 degrees relative to a longitudinal axis of the first support member in response to the first fitting unit rotating around the longitudinal axis of the first support member.

15. The apparatus of claim 12, wherein the elongated member is slidably connected to the fifth connector, and wherein the elongated member is connected to a composition, the composition comprising:
- a fourth fitting unit comprising a sixth connector and a seventh connector, the sixth connector and the seventh connector being spaced between 75 and 105 degrees apart, the sixth connector being coupled with the second support member, the seventh connector being coupled to a fifth fitting unit;
- the fifth fitting unit comprising an eighth connector and a ninth connector, the eighth connector and the ninth connector being spaced between 75 and 105 degrees apart, the eighth connector being coupled with the seventh connector of the fourth fitting unit, the ninth connector being coupled with a sixth fitting unit; and
- the sixth fitting unit comprising a tenth connector, the tenth connector being configured to slidably connect to the elongated member,
whereby, the elongated member can be positioned into a at least third position and a at least fourth position, the at least third position locking the fourth fitting unit from rotating around the second support member, and the at least fourth position unlocking the fourth fitting unit to rotate around the second support member, wherein all members and fitting units are coupled to each other.

16. The apparatus of claim 15, wherein the fourth connector comprises a revolvable connector and the ninth connector comprises a revolvable connector.

17. The apparatus of claim 15, wherein an opening between the first support member and the second support member is configured to accept an armature for centering the footrest when moving between positions of the footrest,
whereby the armature constraints the footrest side to side sliding movement when operating the footrest in a plurality of positions.

18. An apparatus configured to be used in conjunction with a footrest, the apparatus comprising:
- a first elongated member having a at least first and a at least second leg, the at least first leg having a first axis along a length of the first leg, the at least second leg having a second axis along a length of the second leg, the first and second axis configured to be substantially perpendicular to each other, a fitting unit configured to at least slidably engage and lock the at least first leg of the first elongated member and to at least slidably engage a second elongated member; and
- a third elongated member rotatably connected to the fitting unit and pivotally connected to a supporting member, the third elongated member providing support for the supporting member; and
wherein the supporting member being revolvably connected to the at least second leg of the first elongated member, the at least second leg of the first elongated member being configured to at least slidably engage and to at least lock the second elongated member,
wherein the supporting member comprising a leg portion, whereby an angle defined between a longitudinal axis of the leg portion and a longitudinal axis of the second elongated member is adjustable and is maintained under a foot load; whereby the supporting member and the first elongated member adjustably engage fore and aft along the longitudinal axis of second elongated member at a plurality of positions in a removably locking manner while maintaining the angle between the longitudinal axes of the leg portion and the second elongated member, wherein a longitudinal axis of the at least first leg of the first elongated member and the longitudinal axis of the second elongated member are substantially parallel to each other.

19. The apparatus of claim 18, wherein the at least second leg of the first elongated member is configured to slidably engage the second elongated member at a plurality of positions, and wherein the second elongated member is coupled to a base member.

20. The apparatus of claim 18, wherein the apparatus of claim 18 is a right side embodiment, that is coupled to a left side embodiment, the left side and the right side embodiments being symmetric relative to at least one axis, the left side and the right side embodiments reside within a watercraft; wherein the right side embodiment is configured to accept a first foot of a user, and wherein the left side embodiment is configured to accept a second foot of the user.

* * * * *